United States Patent [19]

Yamamori et al.

[11] 4,358,781

[45] Nov. 9, 1982

[54] INK JET WRITING HEAD WITH SPACER IN CAPILLARY CHAMBER

[75] Inventors: Kiyoshi Yamamori, Yokohama; Masayoshi Miura, Sagamihara; Akira Mizoguchi, Hirakata, all of Japan

[73] Assignee: Matsushita Electric Industrial Company, Limited, Osaka, Japan

[21] Appl. No.: 204,713

[22] Filed: Nov. 6, 1980

[30] Foreign Application Priority Data

Nov. 7, 1979 [JP] Japan ............................... 54-144618
Nov. 14, 1979 [JP] Japan ............................... 54-147947

[51] Int. Cl.³ ............................................ G01D 13/18
[52] U.S. Cl. ................................................ 346/140 R
[58] Field of Search ................................ 346/140 PD

[56] References Cited

U.S. PATENT DOCUMENTS 4,106,032 8/1978 Miura et al. ................. 346/140 PD
4,223,324 9/1980 Yamamori et al. .......... 346/140 PD

*Primary Examiner*—George H. Miller, Jr.

*Attorney, Agent, or Firm*—Lowe, King, Price & Becker

[57] ABSTRACT

An ink jet writing head includes a housing shaped to provide an inner liquid chamber for containing ink therein, a piezoelectric transducer for generating short-duration pressure rises in the liquid in the inner chamber, and an outer liquid chamber which is separated by a dividing plate from the inner liquid chamber and connected thereto by a connecting channel formed in the dividing plate. The outer liquid chamber is of such an axial dimension that it may provide capillary action on the ink supplied from an ink supply source. The outer chamber is formed by an ink nozzle plate secured to a surface of the housing spaced from the dividing plate. The ink nozzle is axially aligned with the connecting channel to cause the ink in the outer chamber to leave the writing head in response to the pressure rise in the inner chamber. A spacer is provided in the other liquid chamber to maintain the axial dimension thereof at a predetermined value regardless of errors which might be produced during manufacture of the housing and assemblage of the writing head.

24 Claims, 13 Drawing Figures

INK JET WRITING HEAD WITH SPACER IN CAPILLARY CHAMBER

BACKGROUND OF THE INVENTION

The present invention relates to apparatus for applying ink droplets to a writing surface, and more particularly to an ink jet writing head which provides consistent writing performance by accommodating machining errors.

DESCRIPTION OF THE PRIOR ART

U.S. Pat. No. 4,106,032, granted to Masayoshi Miura et al. and assigned to the same assignee as the present invention, discloses an ink jet writing head comprising a liquid chamber divided into an inner chamber portion and a disc-like outer chamber portion by a dividing plate having a connecting channel which communicates the inner and outer chamber portions. The inner chamber portion is defined by a piezoelectric transducer to create pressure rises therein and the outer chamber portion is open to the atmosphere through an ink discharge channel that is adjacent and axially aligned with the connecting channel so that upon application of an electrical pulse to the transducer a pressure rise occurs in the inner chamber portion which propagates toward the ink discharge channel producing a stream of ink droplets expelled from the discharge channel toward a writing surface. The outer liquid chamber portion is connected to an ink supply source so that upon the termination of the electrical pulse the ink in the outer chamber portion is sucked in toward the discharge channel. It is known that this pressure rise encounters losses at various points as it propagates toward the discharge channel and that the total amount of such losses accounts for the minimum threshold voltage of the writing head. The thickness of the disc-like outer chamber portion usually ranges from 50 to 400 micrometers to provide capillary action. Although the diameters of the connecting channel and the discharge channel can be precisely machined, the thickness of the disc chamber portion tends to vary in an appreciable range of values due to difficulties encountered in assemblage of writing heads. The inconsistent values of thickness results in different writing heads having different propagation losses. It is found that a deviation of a 1 micrometer in the thickness value results in a peak-to-peak voltage variation of about 1 volt in the threshold level. Such thickness variations also affect the amount of ink discharged per unit time. Particularly, when the disc-like outer chamber portion has different thicknesses across its transverse dimension, the amount of discharged liquid varies from time to time.

The disclosed ink jet writing head further includes an air chambaer which is open to the atmosphere through an air discharge channel that is aligned with to the ink discharge channel to provide a laminar air flow for directing the discharged ink droplets toward the writing head. To provide this laminar air flow, the air chamber is connected to a source of pressurized air which is also connected to the source of ink. The pressure in the air chamber is adjusted so that it is statically balanced against the liquid pressure inside the ink discharge channel. This serves to lower the surface tension of the ink in the discharge channel and hence the minimum threshold voltage. The lowering of minimum threshold voltage is advantageous in that it significantly improves the gradation of reproduced image. This air chamber is also formed into a disc-like chamber, the thickness of which is also susceptible to manufacturing errors.

It is also known that the threshold voltage of a given writing head is variable as a function of the thickness value of the disc-like air chamber, so that variation in the latter value results in different writing heads having different values of threshold voltage. Therefore, the prior art ink jet writing head suffers from inconsistent operating performances which required cumbersome adjustments when writing heads are interchanged.

SUMMARY OF THE INVENTION

Accordingly, the primary object of this invention is to provide an ink jet writing head assuring consistent writing performance regardless of errors which might be produced during machining or other production processes of the writing head.

The ink jet writing head of the present invention comprises a housing which is shaped to form an inner liquid chamber for containing ink to be applied to a surface and having an electromechanical transducer for generating short-duration ink pressure rises in the inner liquid chamber, a dividing plate having therein a connecting channel and secured to the housing opposite to the transducer, a nozzle plate having therein an ink discharge nozzle axially aligned with the connecting channel and secured to a surface of the housing axially spaced from the dividing plate to define an outer liquid chamber. The axial dimension of the outer liquid chamber provides capillary action for ink supplied from an ink source. According to the invention, the writing head further includes spacer means provided in the outer liquid chamber to maintain the axial dimension of the outer liquid chamber at a predetermined value regardless of errors produced during manufacture of the housing and assemblage of the writing head.

The spacer means preferably includes a plurality of angularly spaced and radially extending segments. From the manufacturing standpoint, the spacer means preferably comprises a single plate member having the thickness of the outer liquid chamber and a cutout portion shaped to form a plurality of angularly spaced apart radially extending spacer segments. The spacer segments are located between the ink nozzle plate and the dividing plate. The outer periphery of the plate member is adjacent or in contact with the boundary of the outer liquid chamber so that the plate member is secured in position during manufacture.

The ink jet writing head of this invention may further include an air nozzle plate having therein an air nozzle axially aligned with the ink nozzle. The air nozzle plate is secured to the housing to define an air chamber in communication with a source of pressurized air. A second spacer means is provided in the air chamber. This spacer means may be of identical configuration to but of different size from the spacer means provided in the outer liquid chamber.

BRIEF DESCRIPTION OF THE DRAWINGS

The invention will be further described by way of example with reference to the accompanying drawings, in which.

DETAILED DESCRIPTION

Figure 1:
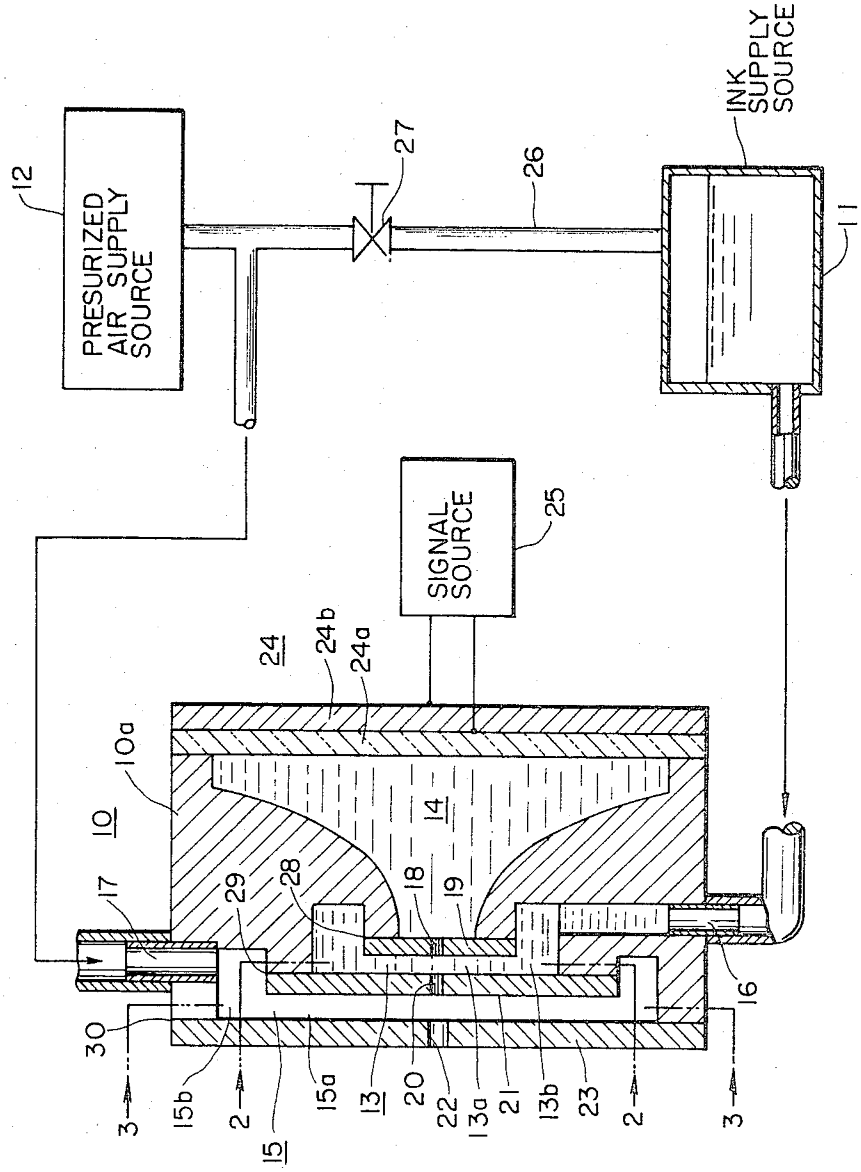
FIG. 1 is an illustration of the ink jet writing apparatus utilizing an ink jet writing head embodying the invention shown in axial cross-section.

In FIG. 1 the ink jet writing apparatus embodying the present invention comprises a writing head 10, a liquid or ink supply source 11 and a source of pressurized air 12. The ink jet writing head 10 comprises an outer liquid chamber 13, an inner liquid chamber 14 and an air chamber 15. The outer liquid chamber 13 comprises a disc-like capillary chamber portion 13*a* and an annular chamber portion 13*b* encircling the capillary chamber portion 13*a*. The annular liquid chamber portion 13*b* is connected to ink supply source 11 with a liquid inlet conduit 16. Similarly, the air chamber 15 comprises a disc-like laminar flow air chamber portion 15*a* and an annular air chamber portion 15*b* encircling the laminar flow chamber portion 15*a*. The annular air chamber portion 15*b* communicates with the pressurized air source 12 via air inlet conduit 17. The inner and outer liquid chambers 14 and 13 are interconnected by a connecting channel 18 provided in a dividing plate 19. The air chamber 15 is open to the atmosphere via an air nozzle 22 formed in a nozzle plate 23 to provide a laminar air flow toward a writing surface located forward of the writing head. The outer liquid chamber 13 is open to the atmosphere via an ink nozzle 20 formed in a nozzle plate 21 and through the air chamber 15 and air nozzle 22. The ink nozzle 20 axially aligned with and adjacent both connecting channel 18 and air nozzle 22.

The inner liquid chamber 14 has a rearwardly increasing diameter portion in contact with a piezoelectric transducer formed by a piezoelectric member 24*a* and an electrode 24*b* connected to a signal source 25.

The application of an electrical pulse to transducer 24 generates a short-duration pressure rise within inner chamber 14 to cause ink in outer chamber 13 to be ejected outwardly from writing head 10 through aligned nozzles 20 and 22 in a stream of droplets confined within a passage formed by the laminar air flow. The pressurized air is also applied through a conduit 26 to the ink supply source 11 to increase the pressure inside the outer liquid chamber 13. This pressure is regulated by a regulating valve 27 provided in the conduit 26 so that it is statically balanced against the pressure in the portion of the air chamber 15 adjacent ink nozzle 20. This feature serves to lower the surface tension of the liquid boundary layer in the ink nozzle 20 to facilitate the ejection of ink, thereby lowering the minimum threshold voltage of the writing head.

Figure 2A:
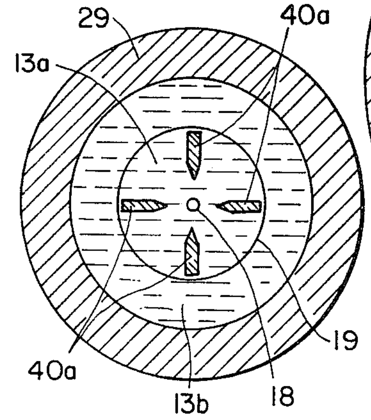
FIGS. 2A to 2C are illustrations of spacers in cross-section taken along the lines 2—2 of FIG. 1.

In accordance with the present invention, first spacer means 40*a*, as shown in FIG. 2A, is located in the disc-like liquid chamber portion 13*a* to determine the thickness or axial dimension of portion 13*a*. In this embodiment, spacer means 40*a* includes a plurality of elongated spacer segments which are angularly spaced apart with respect to connecting channel 18. Each spacer segment 40*a* extends in radial direction and is formed with a tapered portion pointed toward connecting channel 18 to allow the ink in the annular chamber portion 13*b* to flow through the disc-like chamber portion 13*a* to the connecting channel 18.

In a practical aspect of the writing head, the dividing plate 19 is cemented to an annular surface 28 of the writing head housing 10*a*. Surface 28 is machined so that it is spaced rearwardly a predetermined distance from an annular surface 29 to which the ink nozzle plate 21 is cemented. This fabrication involves the use of a suitable adhesive material applied to the contacting surfaces. The spacer means 40*a* is cemented to the dividing plate 19 prior to securing nozzle plate 21 to surface 29. With spacer means 40*a*, machining errors in the distance between surfaces 28 and 29 can be accommodated by appropriately adjusting the thickness of the adhesive layer on the contacting surface 29. Thus, the thickness of disc-like chamber portion 13*a* is maintained to a degree of precision not attainable with the prior art.

Figure 3A:
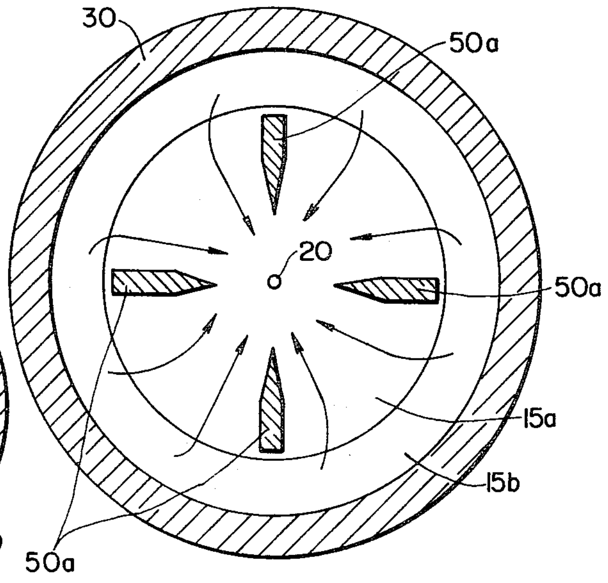
FIGS. 3A to 3C are illustrations of spacers in cross-section taken along the lines 3—3 of FIG. 1.

In the same manner as descried above, the disc-like air chamber portion 15*a* is provided with spacer means 50*a*, as shown in FIG. 3A. The spacer means 50*a* also includes a plurality of angularly spaced apart, radially extending segments each having a tapered portion pointed toward ink nozzle 20. Air flow passage is thus not obstructed by the spacer segments 50*a*. Segments 50*a* are cemented by adhesive to the nozzle plate 21 after the latter is secured in place in the manner just described. With the spacer means 50*a* being secured in position, the air nozzle plate 23 is cemented to an annular surface 30 by adhesive material in the form of a layer having an appropriate thickness to accommodate machining errors which might exist in the distance between the annular surfaces 29 and 30, so that the thickness of the disc-like chamber 15*a* is maintained to a degree of precision not attainable with the prior art.

Figure 2B:
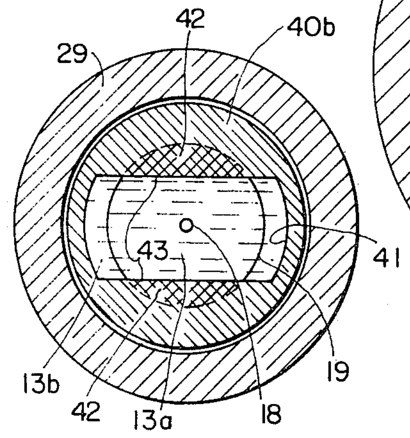

FIGS. 2B, 2C, 3B and 3C are illustrations of modified forms of spacer means of FIGS. 2A and 3A, wherein the same reference numerals with different alphabetic subscripts are used to indicate corresponding parts. In FIG. 2B, spacer means 40*b* has a generally disc-like configuration having an inner cutout portion 41 which radially extends beyond the periphery of the dividing plate 19 to allow the ink in the annular chamber 13*b* to flow into the capillary chamber portion 13*a*. The outer periphery of the spacer disc 40*b* is adjacent to or in contact with the outside wall of the annular liquid chamber portion 13*b* so that the disc 40*b* is secured in position during manufacture. The cutout portion 41 has a pair of straight edges 43 which define cross-hatched areas 42 with the outer periphery of the dividing state 19. The portions of the rear side of spacer 40*b* which are cross-hatched are in contact with or cemented to the dividing plate 19, while the entire surface of the front side thereof is in contact with or cemented to the ink nozzle plate 21.

Figure 3B:
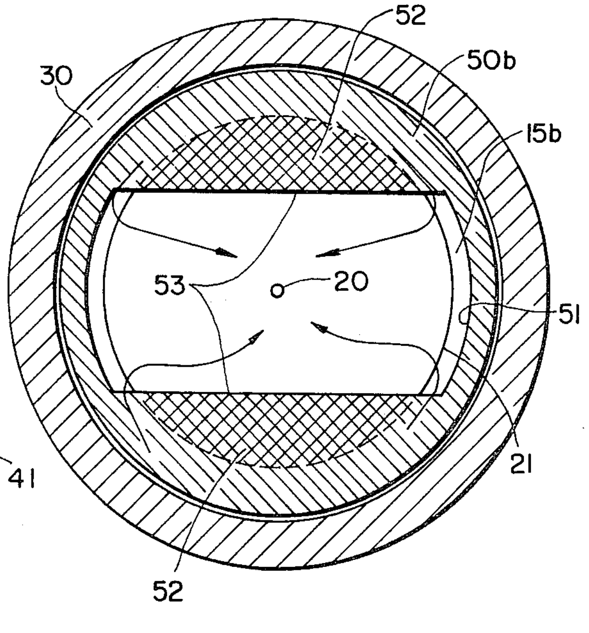

In FIG. 3B, spacer means 50*b* is of a disc-like configuration having a cutout portion 51 which radially extends beyond the outer periphery of the disc-shaped ink nozzle plate to allow air to introduce thereinto from the annular air chamber portion 15*b*. Straight edges 53 of the cutout portion 51 defines cross-hatched areas 52 with the outer periphery of the disc-shaped ink nozzle plate 21. The portions of the rear side of spacer 50*b* which are cross-hatched are in contact with or cemented to the ink nozzle plate 21, while the entire surface of its front side is in contact with or cemented to the air nozzle plate 23. The outer periphery of the spacer 50*b* is in contact with or adjacent to the outside wall of the annular air chamber portion 15*b* so that the spacer 50*b* is secured in position during manufacture.

Figure 2C:
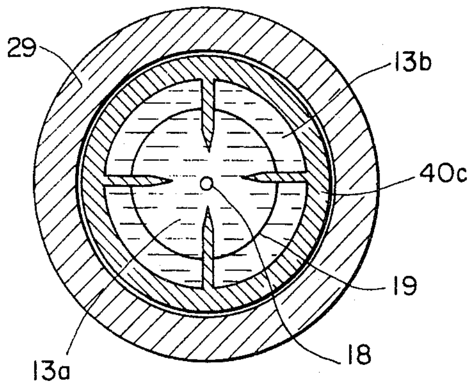
Figure 3C:
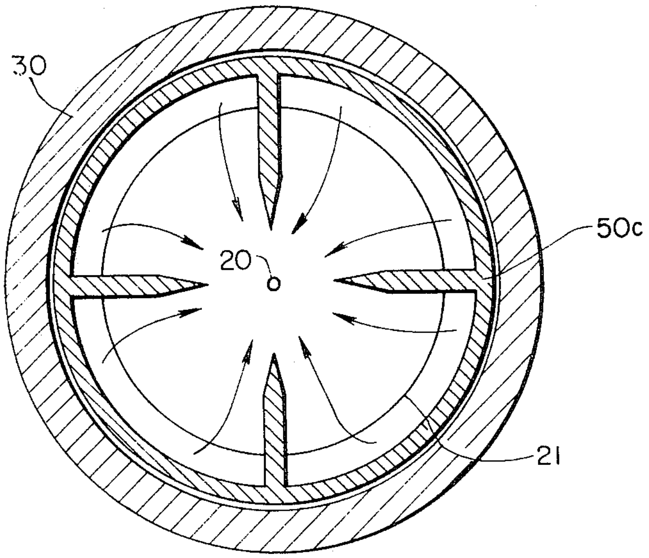

Spacer means 40*c* and 50*c* of similar construction shown respectively in FIGS. 2C and 3C are a preferred form of the invention. In FIG. 2C, spacer 40*c* comprises an annular member having a plurality of integrally formed spacer segments which radially inwardly extend beyond the periphery of the dividing plate 19. These inwardly extending portions are in contact with or cemented to the dividing plate 19 to serve as spacer elements. The outer perimeter of the ring-shaped portion is adjacent or in contact with the outside wall of the annular liquid chamber portion 13*b* to secure the spacer 40*c* in place during manufacture, and the inner perimeter of the ring-shaped portion lies within the area of the annular ink chamber 13*b* to secure communication between the latter and the capillary chamber 13*a*. The inwardly extending segments are preferably equi-angularly spaced apart with respect to the ink nozzle 18 so that the rate of ink flow toward the nozzle 18 is substantially equal in all directions.

In FIG. 3*c*, the outer perimeter of annular spacer 50*c* is adjacent to or in contact with the outside wall of the annular air chamber portion 15*b*, and the inner perimeter thereof lies within the annular chamber portion 15*b* to secure communication between the latter and the air chamber portion 15*a*. The plurality of spacer segments extend inwardly between the periphery of the ink nozzle plate 21 so that the inwardly extending portions serve as spacer elements between the nozzle plates 21 and 23.

Figure 4:
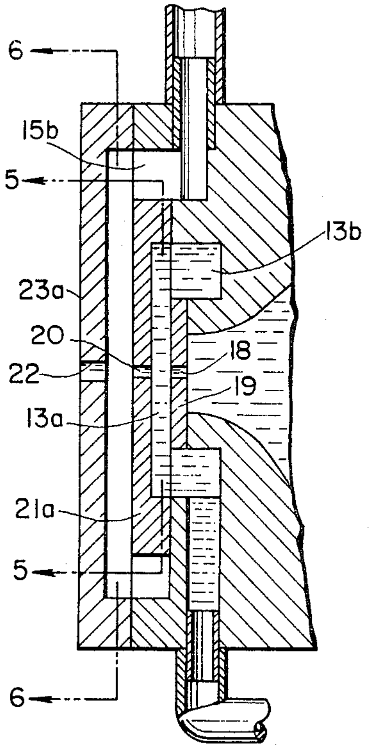
FIG. 4 is an illustration of a partial cross-sectional view of the ink jet writing head of FIG. 1 in a modified form.
Figure 5:
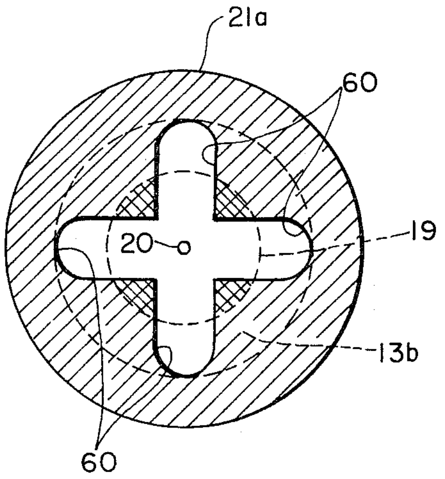
FIG. 5 is an illustration of the ink nozzle plate in cross-section taken along the lines 5—5 of FIG. 4.
Figure 6:
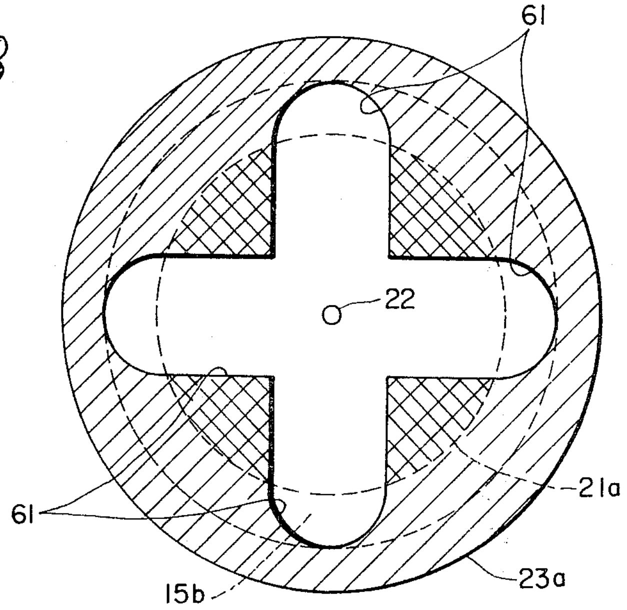
FIG. 6 is an illustration of the air nozzle plate in cross-section taken along the lines 6—6 of FIG. 4.

FIGS. 4 to 6 are illustrations of further embodiments of the present invention wherein those corresponding to the elements of FIG. 1 are indicated by corresponding numerals. In FIG. 4, in which a partial cross-sectional view of writing head 10 is shown, spacer elements are integrally formed with the ink and air nozzle plates 21*a* and 23*a* respectively. As clearly shown in FIG. 5, the ink nozzle plate 21*a* is formed on the rear side thereof with a recess 60 with a depth equal to the thickness of the capillary action chamber 13*a*. The recess 60 includes angularly spaced apart portion which extend radially outwardly from the ink nozzle 20 forming the capillary chamber 13*a* and further extend beyond the periphery of the dividing plate 19 but not beyond the periphery of the nozzle plate 21*a*. Thus, the outwardly further extending portions of the recess 60 communicate with annular liquid chamber portion 13*b*. Therefore, the nozzle plate 21*a* is in contact with the dividing plate 19 in areas as cross-hatched in FIG. 5 to serve as the spacer elements.

In FIG. 6, the air nozzle plate 23*a* is formed on the rear side thereof with a recess 61 having a depth equal to the thickness of the laminar flow air chamber 15*a*. The recess 61 includes angularly spaced apart portions which extend radially outwardly from the air nozzle 22 forming the laminar air flow chamber 15*a* and further extend beyond the periphery of the ink nozzle plate 21*a* but not beyond the periphery of the air nozzle plate 23*a*. Thus, the outwardly further extending portions of the recess 61 communicate with annular air chamber portion 15*b*. The nozzle plate 23*a* is thus in contact with the ink nozzle plate 21*a* in areas cross-hatched in FIG. 6 to serve as the spacer elements.

Because of the integral construction of spacer elements with the nozzle plates just described, the embodiments of FIGS. 4 to 6 simplify the assemblage of the writing head.

Figure 7:
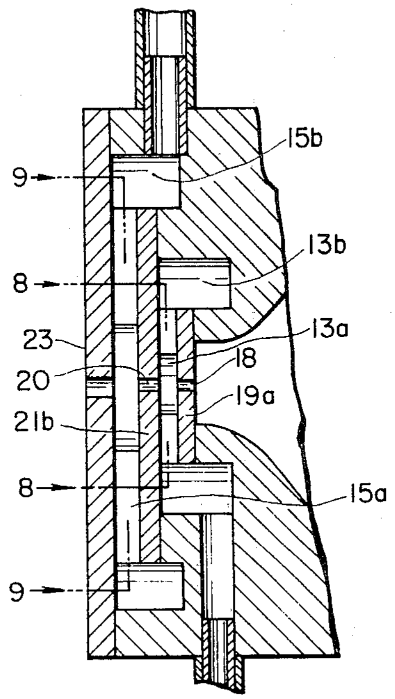
FIG. 7 is an illustration of a partial cross-sectional view of the ink jet writing head of FIG. 1 in a further modified form.
Figure 8:
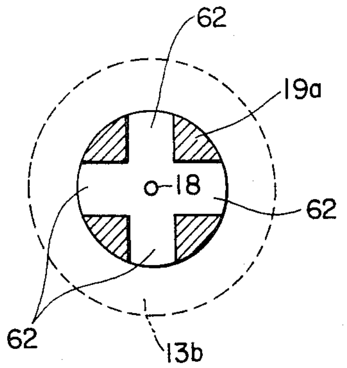
FIG. 8 is an illustration of the dividing plate in cross-section taken along the lines 8—8 of FIG. 7.
Figure 9:
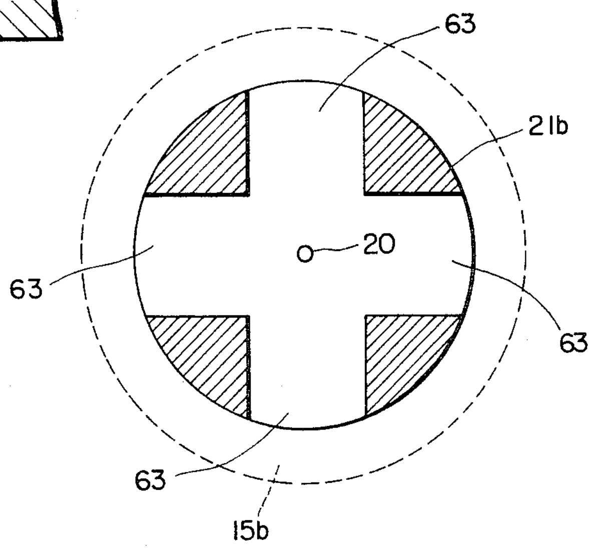
FIG. 9 is an illustration of the ink nozzle plate in cross-section taken along the lines 9—9 of FIG. 7.

Alternative embodiments are shown in FIGS. 7 to 9. In FIGS. 7 and 8, the spacer elements indicated by the cross-hatched areas in FIG. 5 are integrally formed with the dividing plate 19*a*. More specifically, the dividing plate 19*a* is formed on its front side with a recess 62 having a depth equal to the thickness of the capillary chamber portion 13*a*. The recess 62 includes angularly spaced apart portions extending radially outwardly from the connecting channel 18 beyond the periphery of the dividing plate to secure communication between the annular liquid chamber portion 13*b* and the capillary chamber portion 13*a* which is formed by the recess 62. Similarly, as shown in FIGS. 7 and 9, the ink nozzle plate 21*b* is formed on its front side with a recess 63 having a depth equal to the thickness of the laminar air flow chamber 15*a*. The recess includes angularly spaced apart portions extending radially outwardly from the ink nozzle 20 forming the laminar air flow chamber 15*a* and further extends beyond the periphery of the ink nozzle plate 21*b* to secure communication with the annular air chamber portion 15*b* and the laminar air flow chamber 15*a*. The hatched areas in FIG. 9 are in contact with the air nozzle plate 23 to serve as the spacer elements.

What is claimed is:

1. An ink jet writing head for applying ink droplets to a surface, comprising a housing shaped to form an inner liquid chamber for containing ink to be applied to the surface, said housing having an electromechanical transducer for generating short-duration increases of ink pressure in said inner liquid chamber, a dividing plate having therein a connecting channel and secured to the housing opposite to said transducer, a nozzle plate having therein an ink discharge nozzle axially aligned with said connecting channel and secured to the housing at a predetermined distance from said dividing plate to define an outer liquid chamber with said dividing plate, said predetermined distance being sufficient to provide capillary action in said outer liquid chamber, said outer chamber being in communication with an ink supply source, and spacer means provided in said outer liquid chamber for maintaining the axial dimension of said outer liquid chamber substantially equal to said predetermined distance, said spacer means extending radially within the outer chamber.

2. An ink jet writing head as claimed in claim 1, wherein said spacer means comprises a plurality of radially extending segments being angularly spaced apart from each other.

3. An ink jet writing head as claimed in claim 1, wherein said outer liquid chamber comprises an inner capillary chamber portion and an outer annular chamber portion having a greater axial dimension than the axial dimension of said inner capillary chamber portion, and wherein said spacer means comprises a plate member having the thickness of said axial dimension of said inner capillary chamber portion and a cutout portion therein so that the remainder of said plate member is partially in contact with said dividing plate, said cutout portion extending radially beyond the outer periphery of said dividing plate to secure communication between said outer annular liquid chamber portion and said inner capillary chamber portion, the outer periphery of said plate member being adjacent said outer annular chamber portion.

4. An ink jet writing head as claimed in claim 3, wherein said remainder of said plate member is formed to provide a plurality of angularly spaced apart segments radially extending from the outer periphery of the plate member toward said connecting channel beyond the periphery of said dividing plate.

5. An ink jet writing head as claimed in claim 1, wherein said spacer means is integrally formed with said nozzle plate.

6. An ink jet writing head as claimed in claim 5, wherein said outer liquid chamber is a recess formed on one surface of said nozzle plate facing toward said dividing plate, said recess including a plurality of angularly spaced apart portions extending radially outwardly from said ink nozzle beyond the periphery of said dividing plate but not beyond the periphery of said nozzle plate, said surface being in contact with said dividing plate at locations lying between said angularly spaced apart portions of the recess and in contact with said housing at locations adjacent the periphery of said nozzle plate.

7. An ink jet writing head as claimed in claim 1, wherein said spacer means is integrally formed with said dividing plate.

8. An ink jet writing head as claimed in claim 7, wherein said outer liquid chamber is a recess formed on one surface of said dividing plate facing toward said nozzle plate, said recess including a plurality of angularly spaced apart portions extending radially outwardly away from said connecting channel beyond the periphery of said dividing plate, said surface being in contact with said nozzle plate at locations lying between said angularly spaced apart portions of said recess.

9. An ink jet writing head as claimed in any one of the preceding claims, further comprising a second nozzle plate having therein an air discharge nozzle and secured to said housing to define with the ink discharge nozzle plate an air chamber in communication with a source of pressurized air, said air discharge nozzle being in alignment with said ink discharge nozzle to enable air and ink to eject from the writing head, said air chamber being axially dimensioned to produce a laminar air flow in the air chamber, and second spacer means provided in said air chamber to maintain the axial dimension at a predetermined size.

10. An ink jet writing head as claimed in claim 9, wherein said second spacer means comprises a plurality of radially extending and angularly spaced apart segments.

11. An ink jet writing head as claimed in claim 9, wherein said air chamber comprises an inner laminar air flow chamber portion and an outer annular air chamber portion having a greater axial dimension than the axial dimension of said inner laminar air flow chamber portion, and wherein said second spacer means includes a plate member having the thickness of said axial dimension of said inner laminar air flow chamber portion and a cutout portion therein so that the remainder of said plate member is partially in contact with the ink nozzle plate, said cutout portion extending radially beyond the outer periphery of said ink nozzle plate to maintain communication between said outer annular air chamber portion and said inner laminar air flow chamber portion, the outer periphery of said plate member being adjacent said outer annular air chamber portion.

12. An ink jet writing head as claimed in claim 11, wherein said remainder of said plate member includes a plurality of angularly spaced apart segments radially extending from the outer periphery of the plate member toward said ink discharge nozzle beyond the periphery of said ink nozzle plate.

13. An ink jet writing head as claimed in claim 9, wherein said second spacer means is integrally formed with said second nozzle plate.

14. An ink jet writing head as claimed in claim 13, wherein said air chamber is a recess formed on one surface of said second nozzle plate facing toward said ink nozzle plate, said recess including a plurality of angularly spaced apart portions extending radially outwardly from said air nozzle beyond the periphery of said ink nozzle plate but not beyond the periphery of said second nozzle plate, said surface being in contact with said first nozzle plate at locations lying between said angularly spaced apart portions of the recess and in contact with said housing at a location adjacent the periphery of said second nozzle plate.

15. An ink jet writing head as claimed in claim 9, wherein said second spacer means is integrally formed with said ink nozzle plate.

16. An ink jet writing head as claimed in claim 15, wherein said air chamber is a recess formed on one surface of said ink nozzle plate facing toward said second nozzle plate, said recess including a plurality of angularly spaced apart portions extending radially outwardly from said ink nozzle beyond the periphery of said ink nozzle plate, said surface being in contact with said second nozzle plate at locations lying between said angularly spaced apart locations of said recess.

17. An ink jet writing head for applying ink droplets to a surface, comprising a housing shaped to form an inner liquid chamber for containing ink to be applied to the surface, said housing having means for generating short-duration increases of ink pressure in said inner liquid chamber, a dividing plate having therein a connecting channel secured to the housing opposite to said pressure means, a first nozzle plate having therein an ink discharge nozzle axially aligned with said connecting channel and secured to the housing at a predetermined distance from said dividing plate to define an outer liquid chamber with said dividing plate, said outer chamber being in communication with an ink supply source, a second nozzle plate having therein an air discharge nozzle and secured to said housing to define with the first nozzle plate an air chamber in communication with a source of pressurized air, said air discharge nozzle being in alignment with said ink discharge nozzle to eject air and ink from the writing head, the axial dimension of said air chamber being sufficient to provide a laminar air flow therein, and spacer means provided in said air chamber and extending radially therein to maintain said axial dimension of said air chamber.

18. An ink jet writing head as claimed in claim 17, wherein said spacer means comprises a plurality of radially extending and angularly spaced apart segments.

19. An ink jet writing head as claimed in claim 17, wherein said air chamber comprises an inner laminar air flow chamber portion and an outer annular air chamber portion having a greater axial dimension than the axial dimension of said inner laminar air flow chamber portion, and wherein said second spacer means comprises a plate member having the thickness of said axial dimension of said inner laminar air flow chamber portion and a cutout portion therein so that the remainder of said plate member is partially in contact with the first nozzle plate, said cutout portion extending radially beyond the outer periphery of said first nozzle plate to maintain communication between said outer annular air chamber portion and said inner laminar air flow chamber portion, the outer periphery of said plate member being adjacent said outer annular air chamber portion.

20. An ink jet writing head as claimed in claim 19, wherein said remainder of said plate member includes a plurality of angularly spaced apart segments radially extending from the outer periphery of the plate member toward said ink discharge nozzle beyond the periphery of said first nozzle plate.

21. An ink jet writing head as claimed in claim 17, wherein said second spacer means is integrally formed with said second nozzle plate.

22. An ink jet writing head as claimed in claim 21, wherein said air chamber is a recess formed on one surface of said second nozzle plate facing toward said first nozzle plate, said recess including a plurality of angularly spaced apart portions extending radially outwardly from said air nozzle beyond the periphery of said first nozzle plate but not beyond the periphery of said second nozzle plate, said surface being in contact with said first nozzle plate at locations lying between said angularly spaced apart portions of the recess and in contact with said housing at a location adjacent the periphery of said second nozzle plate.

23. An ink jet writing head as claimed in claim 17, wherein said second spacer means is integrally formed with said first nozzle plate.

24. An ink jet writing head as claimed in claim 23, wherein said air chamber is a recess formed on one surface of said first nozzle plate facing toward said second nozzle plate, said recess including a plurality of angularly spaced apart portions extending radially outwardly from said ink nozzle beyond the periphery of said first nozzle plate, said surface being in contact with said second nozzle plate at locations lying between said angularly spaced apart portions of said recess.

* * * * *